April 1, 1958 L. H. WHEELER ET AL 2,828,917
BOARD DIMENSION RECORDER AND LUMBER VOLUME
CALCULATOR AND RECORDER
Filed Sept. 27, 1954 9 Sheets-Sheet 1
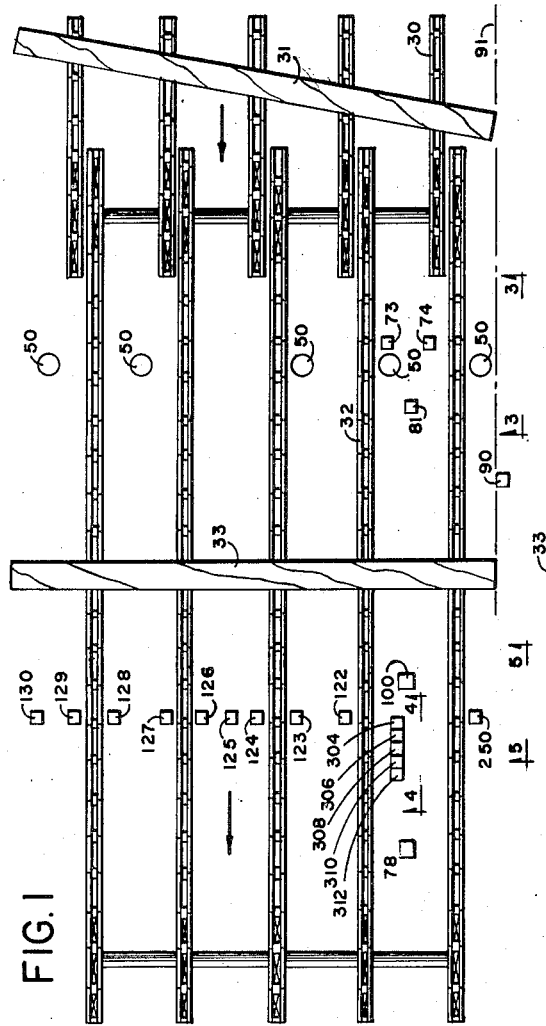
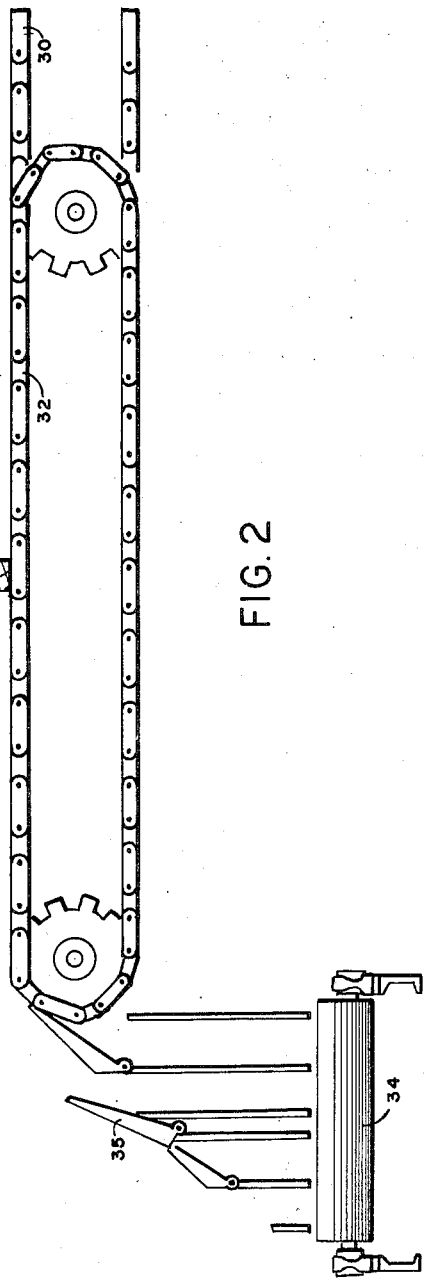
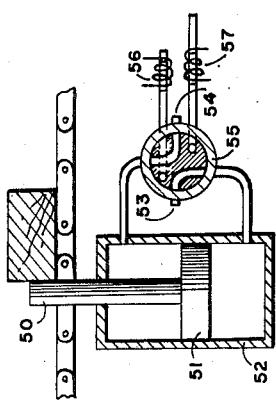
INVENTORS.
LIONEL H. WHEELER
MAVIS J. GREEN
BY
Murray Robinson
ATTORNEY April 1, 1958  L. H. WHEELER ET AL  2,828,917
BOARD DIMENSION RECORDER AND LUMBER VOLUME
CALCULATOR AND RECORDER
Filed Sept. 27, 1954  9 Sheets-Sheet 2
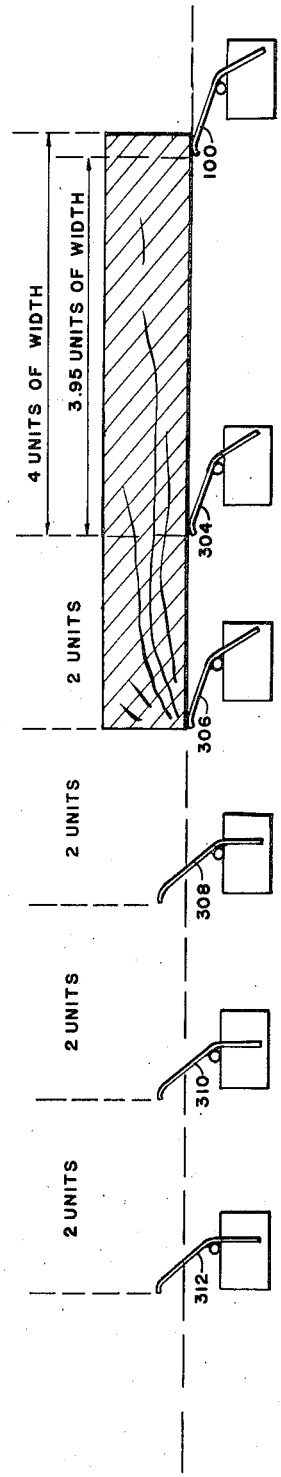
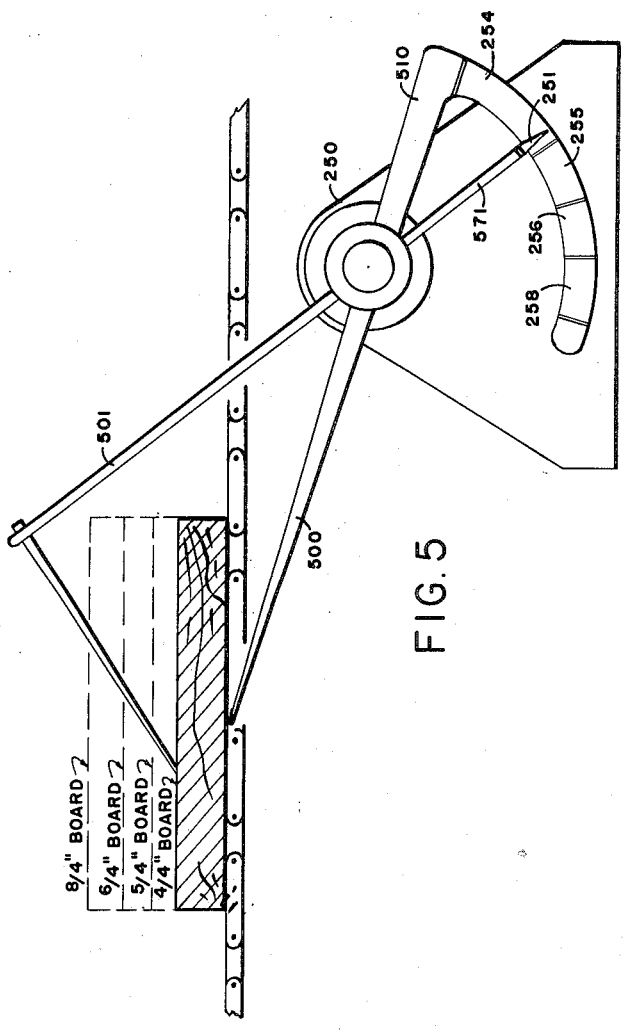
INVENTORS.
LIONEL H. WHEELER
MAVIS J. GREEN
BY
Murray Robinson
ATTORNEY

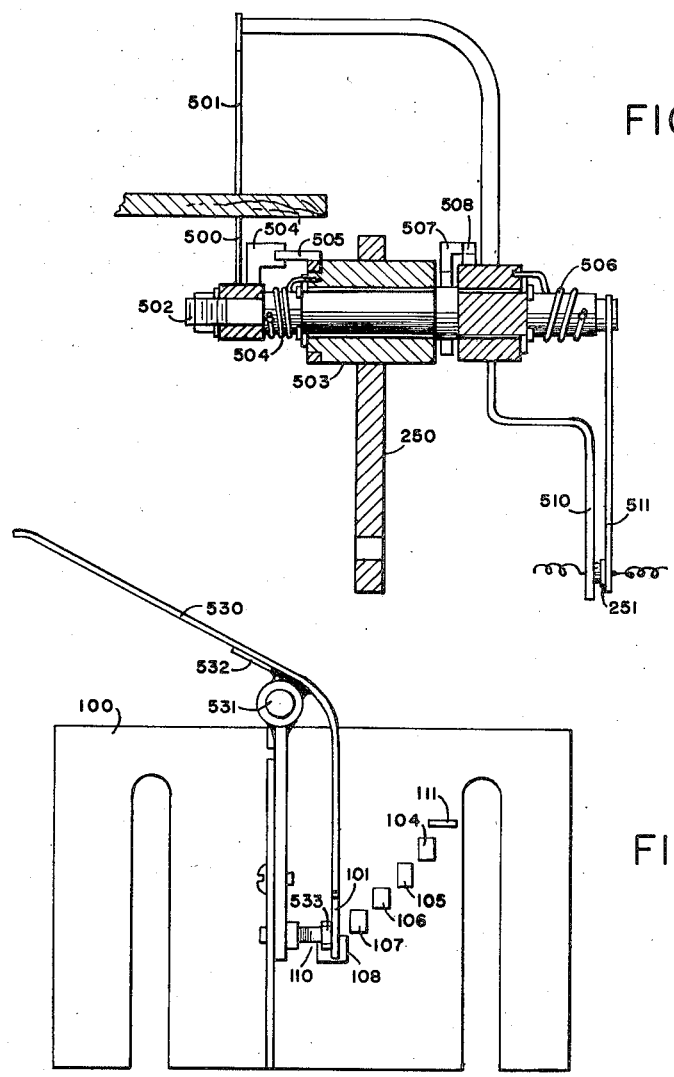

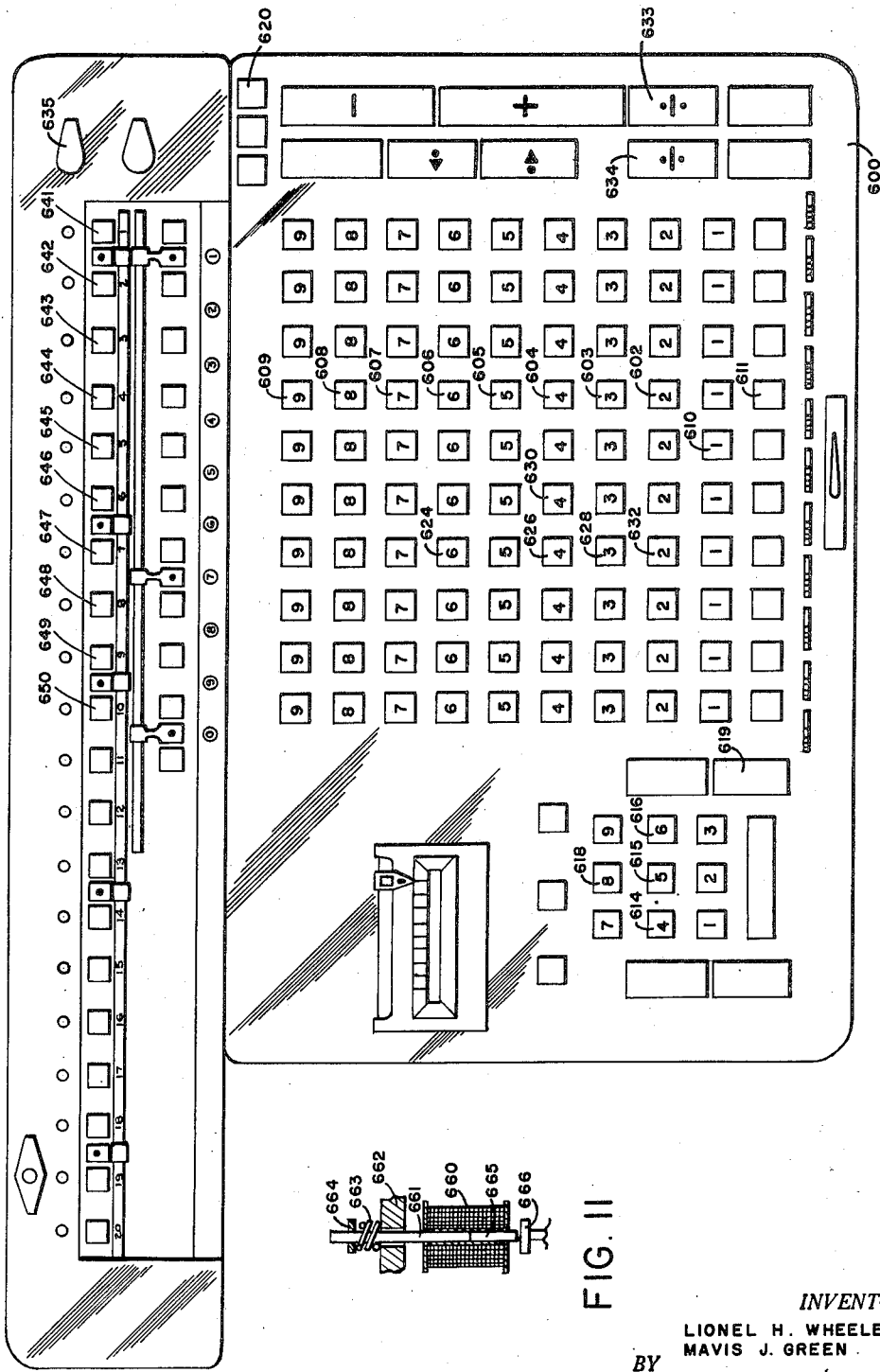

April 1, 1958

L. H. WHEELER ET AL 2,828,917

BOARD DIMENSION RECORDER AND LUMBER VOLUME
CALCULATOR AND RECORDER

Filed Sept. 27, 1954

*INVENTORS.*
LIONEL H. WHEELER
BY MAVIS J. GREEN

*Murray Robinson*
ATTORNEY

INVENTORS.
LIONEL H. WHEELER
MAVIS J. GREEN

United States Patent Office 2,828,917
Patented Apr. 1, 1958

2,828,917

BOARD DIMENSION RECORDER AND LUMBER VOLUME CALCULATOR AND RECORDER

Lionel H. Wheeler and Mavis J. Green, Houston, Tex.

Application September 27, 1954, Serial No. 458,552

22 Claims. (Cl. 235—98)

This invention pertains to recording devices and more particularly to lumber recording devices.

It is the principal object of this invention to provide a device for measuring the dimensions of boards passing along a lumber conveyor and recording the dimensions of each board and also computing the volume of each board and adding it to the total of the volume of boards previously gone through the device and at desired times recording the total volume.

It is another object of the invention to provide such a device that will incorporate as many known commercially available elements, or slight modifications thereof, as possible in the combination, whereby the device can be easily and inexpensively manufactured.

It is still another object of the invention to provide such a device which will operate properly even though the boards are close together on the conveyor.

It is a further object of the invention to provide such a device which will operate satisfactorily even if the boards are askew or out of line on the conveyor.

It is a further object of the invention to provide such a device which will operate correctly over a wide range of speeds of board travel along the conveyor.

It is another object of the invention to provide such a device that will be simple and inexpensive to construct, operate and maintain.

Another object of the invention is to provide such a device that will be wholly reliable.

Other objects and advantages of the invention will appear from the following description of a preferred embodiment thereof wherein:

Figure 1 is a plan view of a device according to the invention;

Figure 2 is a side elevation of the device shown in Figure 1; certain parts being omitted for clarity;

Figure 3 is a side elevation at lines 3—3 of Figure 1 showing one of the lumber stop pins shown in Figure 1 but omitted in Figure 2, together with a schematic representation of operating means therefor;

Figure 4 is a vertical section on lines 4—4 of Figure 1, partly schematic, and to a larger scale, showing the width measuring devices;

Figure 5 is a side elevation taken at lines 5—5 of Figure 1 showing to a larger scale the thickness measuring device;

Figure 6 is a vertical section through the thickness measuring device of Figure 5;

Figure 7 is a side elevation of the operating switch;

Figure 10 is a plan view of a calculating machine used in the device;

Figure 11 is a vertical section through a key actuating device;

Figure 8:
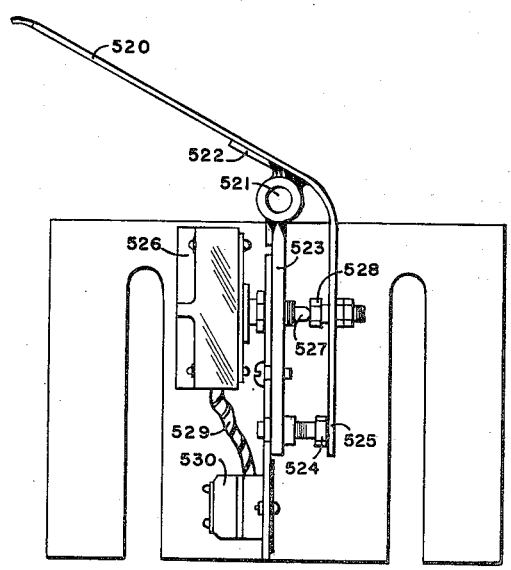
Figure 8 is a side view of one of the switch actuators.

Referring now to Figures 1 and 2 there is shown a chain type conveyor 30 constituting the "green chain" receiving boards freshly cut by the saw mill. A board 31 is shown on conveyor 30 being carried to the left in the direction of the arrow. Another chain conveyor 32 receives boards from the green chain. Conveyor 32 moves at a higher linear speed than the green chain so that conveyor 32 may be called the "speed chain." The object of the speed chain is to separate boards which may be close together on the green chain. A board 33 is shown on the speed chain moving to the left in the direction of the arrow.

As shown in Figure 2, the end of the speed chain feeds boards to an edge sorter 34 through a thickness sorter 35. The edge sorter is preferably of the type shown in United States Patent 2,636,601, entitled "Lumber Sorter," issued April 28, 1953, on the joint application of H. E. Bovay, Jr., Lionel H. Wheeler, and C. F. Lawler. The thickness sorter is of the type disclosed in the now pending patent application of Lionel H. Wheeler entitled "Lumber Sorter," S. N. 452,344, filed August 26, 1954.

The measuring of each board is accomplished while it is on the speed chain or measuring conveyor 32 and the invention contemplates the use of the subcombination of the measuring conveyor and associated measuring, calculating and recording apparatus separately or in other combinations and positions than with the green chain, thickness sorter, and edge sorter as shown. For example, the subcombination may be used to feed boards from a kiln or storage yard to a railroad car.

Referring now to Figure 3, as well as Figure 1, there are a plurality of vertically movable stops or pins 50 disposed across the conveyor 32 near the upstream end. These pins are connected to pistons such as 51 in air cylinders 52. Opposite sides of the piston are connected to high pressure air line 53 or atmospheric vent 54 according to the position of valve 55 under the control of solenoids 56, 57. The pins are normally elevated to block the passage of boards along the conveyor as shown in Figure 3.

Figure 18A:
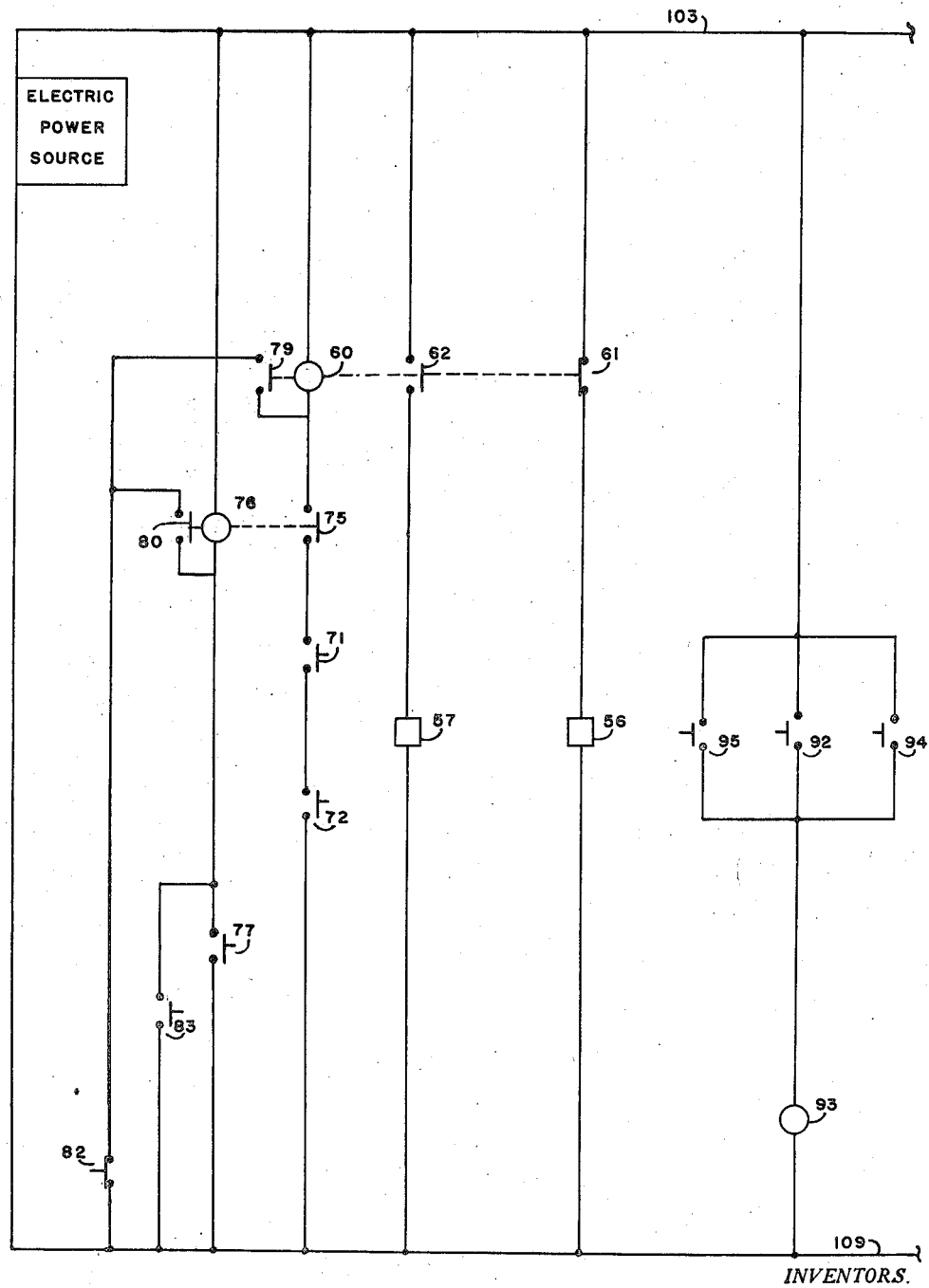
Figures 18A, B, and C are a wiring diagram of the electric circuit of the device.

Referring now also to Figure 18A, solenoids 56 and 57 are under the control of relay 69 which has normally closed contacts 61 in series with solenoid 56, whereby pins 50 are normally elevated, and normally open contacts 62 in series with solenoid 57, whereby the pins 50 are depressed when relay 60 is energized.

Relay 60 is energized upon closure of normally open contacts 71, 72 by board depressing switch actuators 73, 74 respectively, when, in addition, contacts 75 of relay 76 are closed. Relay 76 is energized upon closure of contacts 77 by a board depressing switch actuator 78.

Relay 60, when energized, holds itself energized through closure of contacts 79, and relay 76, when energized, holds itself energized through closure of contacts 80. As soon as a board has passed by stop pins 50 it depresses switch actuator 81 to open normally closed contacts 82 to open the holding circuits for relays 76 and 60, thereby de-energizing solenoid 57 and re-energizing solenoid 56 to raise pins 50. A board lying askew on the conveyor, such as board 31 is and will be when it reaches conveyor 32, will strike one end first against one of the stop pins 50. That end will then be held up until the rest of the board contacts other stop pins and lies straight across the conveyor. The pins 50 cannot have been depressed until this condition is reached, for the board must be straight across the conveyor to depress both switch actuators 73, 74. By this means each board is brought to a position exactly perpendicular to the direction of conveyor travel before being measured. Then, if the third switch actuator 78 has been or is subsequently depressed, as will be the case when the preceding board has passed by the measuring station further downstream, the solenoid 57 will be actuated to move the valves 55 to depress pins 50 and allow the board to move on to the measuring station. By this means boards are fed to the measuring station only when it is clear of boards.

As soon as a board leaves switch actuators 73, 74, they return to their original positions. However, the relay 60 controlled by these actuators remains energized through its holding circuit until the board has passed pins 50 and depressed actuator 81 which de-energizes relay 60 and raises pins 50. Depression of switch actuator 81 also opens the hold circuits on relay 76 and thereby reopens the third set of contacts 75 in series with relay 60 so that even if another board gets in position over switch actuators 73, 74 it cannot move farther until the other previous board passes over actuator 78. By this means only one board at a time is fed to the measuring station.

Relay 60 insures that a board will have enough time to get over pins 50 after it leaves actuators 73, 74. Relay 76 is provided so that if there is no board on actuators 73, 74 when the preceding board passes over actuator 78, the passage of the preceding board will nevertheless be noted and set up the circuit so that when a board finally does reach what may be called the lumber straightening station and depresses actuators 73, 74, it can pass on to the measuring station. When the apparatus is first started, it may be necessary to prepare the circuit for the lumber straightening station by manually closing contacts 77 or another switch 83 in parallel therewith more conveniently located for manual operation.

After a board leaves the lumber straightening station it next passes by switch actuator 90. Under ordinary circumstances, one end of each board will have been placed on the conveyor 30 so as to be in line with the even lumber line indicated by a dashed line 91 in Figure 1. In such position the near end of the board, that is, the end adjacent the even lumber line will pass by actuator 90 without touching it. At certain times, however, the operator may pull a board beyond the even lumber line where it will strike and depress actuator 90 which will cause closure of normally open contacts 92 (see Figure 18A) and energize solenoid 93 which will record the volume of lumber that has previously passed through the measuring station in a manner that will be described hereinafter.

The operator may desire to pull a board out of line to record the volume of lumber whenever he shifts from one type of wood to another at the mill. It may also be desired to keep a record of the volume accumulated at the end of each hour or other predetermined interval, and for this purpose contacts 94 are provided in parallel with contacts 92, contacts 94 being operated to close periodically under the control of a conventional or any suitable clock mechanism not shown. A manually operated switch 95 is in parallel with contacts 92, 94, so that whenever desired the volume of lumber passed can be recorded, for example in loading a freight car on a railroad, a record can be made whenever all of one lot or one customer's lumber has been loaded.

Figure 18B:
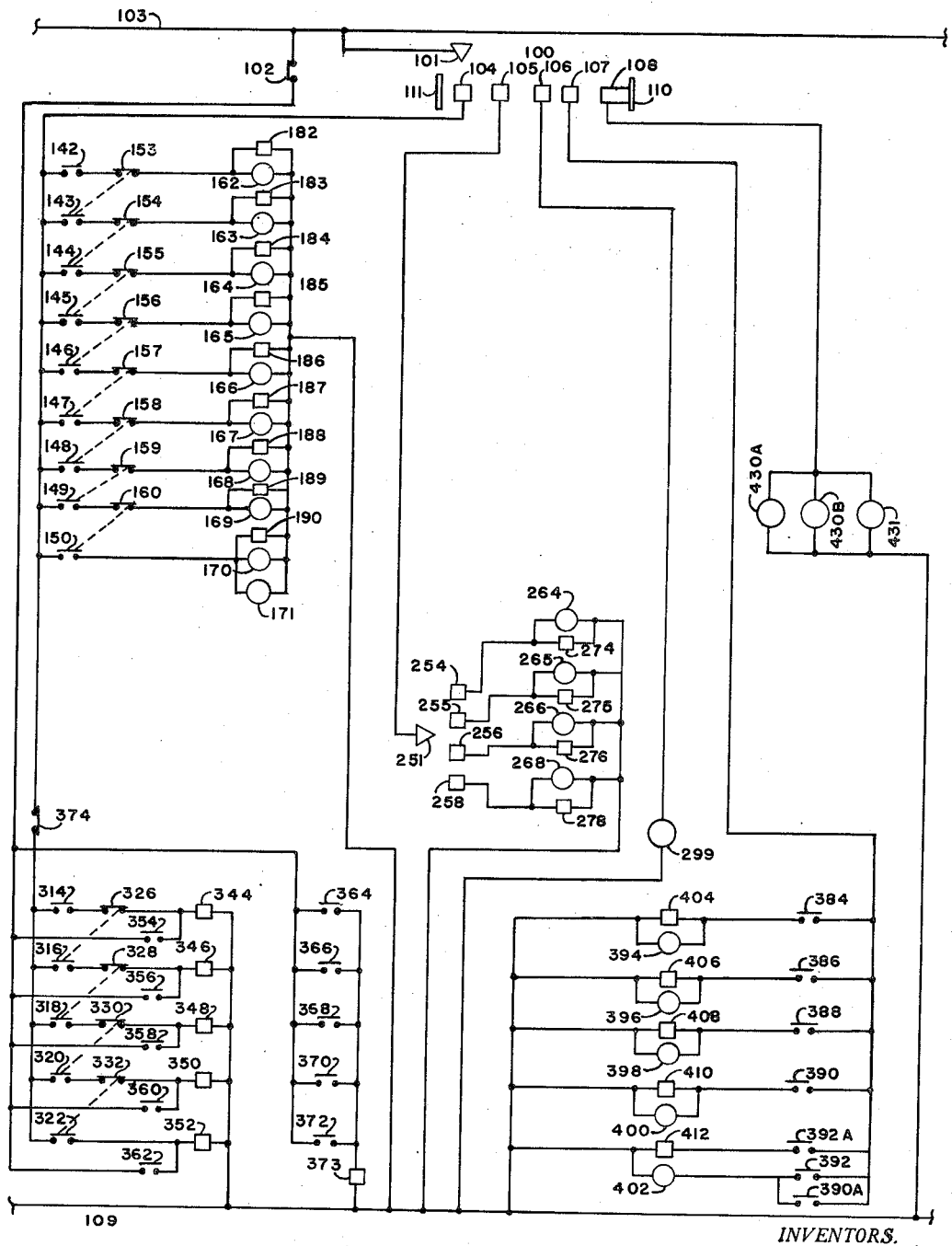

Referring again to Figure 1, after a board passes record actuator 90 it next encounters multiple contact operating switch 100. As shown in Figure 18B, the moving contact 101 of switch 100 is connected through normally closed contacts 102 controlled by switch actuator 78 to line 103 coming from one side of the source of electric power shown in Figure 18A. The fixed contacts 104–108 of switch 100 each connect through various instrumentalities to line 109 coming from the other side of the electric power source. As contact 101 moves from stop 110 to stop 111 across contacts 104–108 upon depression of the actuator arm of the switch, described in more detail hereinafter, none of the instrumentalities in series with contacts 104–108 is actuated because the board has not yet reached a position to close various contacts in series therewith.

After depressing the actuator arm of switch 100, and while the board is maintaining this arm depressed, the leading edge of the board depresses one or more of switch actuators 122–130 depending on the length of the board, these actuators being spaced two feet apart across the conveyor 32 so as to be actuated by boards of 4, 6, 8, 10, 12, 14, 16, 18, and 20 foot lengths respectively. Additional actuators to care for longer, shorter, or intermediate length boards can be provided if desired.

Actuator 122 controls normally open switch 142 (Figure 18B) and in like manner actuators 123–130 control normally open switches 143–150. Actuator 123 also controls normally closed switch 153 in series with switch 142. In like manner, actuators 123–130 control normally closed switches 154–160 in series with switches 143–159 respectively. As will be described in more detail hereinafter, each of the normally open switches 142–150 is in series with length reacting means for recording length and/or introducing a length factor into a calculating machine. A board of a given length will not only close all of the contacts of group 143–150 from contacts 143 on through the contacts corresponding to its particular length, but will also open a set of contacts of the 153–160 group in series with each of the sets of contacts of group 143–150 that it has closed except the one set corresponding to its particular length. By this means a board prepares a circuit for one and only one length reacting means for energization by operating switch 100 when its moving contact 101 engages fixed contact 104 which may be called the length contact.

Switches 142, 153 are in series with solenoid 162. In like manner, pairs of switches 143, 154 through 149, 160 are in series with solenoids 163–169. Switch 150 is in series with solenoids 170, 171. One side of each of solenoids 162–171 is connected to power supply line 109. Solenoids 162–169 operate keys for digits 2 through 9 on a calculating machine; solenoids 170, 171, operate keys for digits 1 and 0 on the calculating machine, as will be described in more detail hereinafter.

Figure 18C:
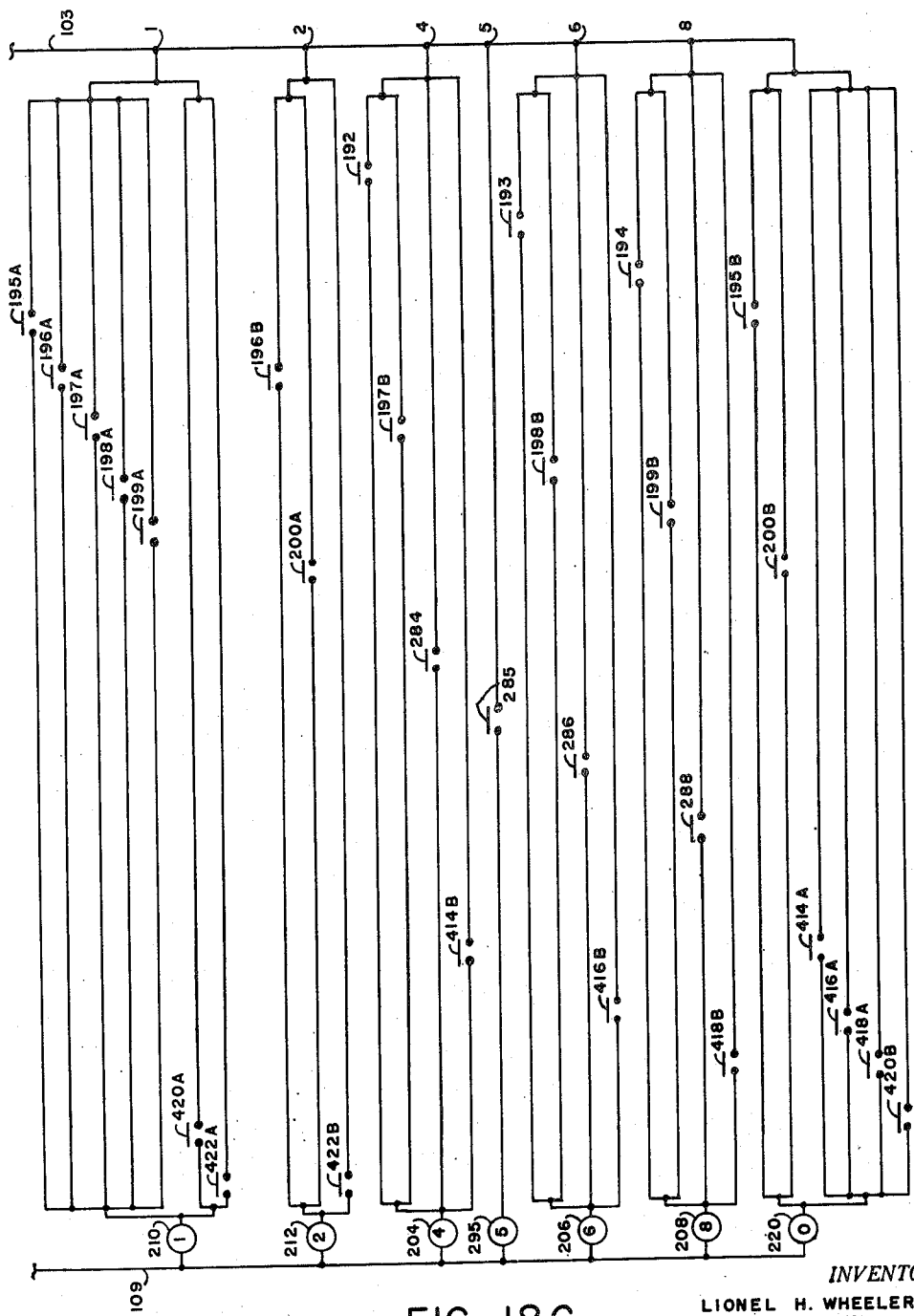

In parallel with solenoids 162–169 and 170, 171 are relays 182–190 respectively. Relays 182–184 control contacts 192–194 respectively, which, as shown in Figure 18C, are in series across lines 103, 109, with solenoids 204, 206, 208 which actuate keys on an adding machine corresponding to digits 4, 6, and 8 respectively. The actuation of the adding machine keys will be described in more detail hereinafter. However, it should be noted at once that the adding machine performs no adding function in this invention, being merely a convenient available form of recording means. Relays 185–190 control pairs of contacts 195A, 195B through 200A, B respectively. Contacts 195A–199A are in parallel and the group is in series with solenoid 210 which actuates a key on the adding machine corresponding to digit 1. Contacts 195B–199B are respectively in series with solenoids 212, 204, 206, 208 which actuate keys on the adding machine corresponding to digits 2, 4, 6, and 8 respectively contacts 200A and 200B are in series with solenoids 212 and 220 respectively, which actuate keys on the adding machine corresponding to digits 2 and 0 respectively. Though actuated by the same relays, the contacts 195A–200A close prior to contacts 195B–200B so that in depressing keys for the pairs of digits 12, 14, 16, 18, 20 on the adding machine the key for the first digit of each pair will be depressed first.

By the foregoing means, when the trailing edge of a board leaves the actuator arm of switch 100, allowing it to return to its original undepressed position under the action of a spring as will be described in more detail hereinafter, and when the moving contact 101 engages length contact 104, and while the body of the board is still depressing one or more of the length switch actuators 122–130, a key or pair of keys on both the adding and calculating machines will be depressed corresponding to the length of the board.

Referring again to Figure 1, at about the same time the leading edge of a board depresses one or more of the length switch actuators 122–130, it also engages the actuating arms of a multiple contact switch 250 as shown in Figure 5, whose construction will be described in more detail hereinafter. Depending on the thickness of the board, the moving contact 251 thereof (Figure 18B) will remain in engagement with relatively fixed contact 254 or be moved into engagement with one of the other relatively fixed contacts 255, 256, 258. Contacts 254, 255, 256, 258 will be engaged by boards of 4/4", 5/4", 6/4" and 8/4" respectively. In series with contacts 254–258 are thickness reacting means for recording width and/or for introducing a width factor into a calculating machine. By this means a board prepares a circuit for one and only one thickness reacting means for energization by operating switch 100 when its moving contact 101 engages fixed contact 105, which may be called the thickness contact.

Contacts 254–258 are in series with solenoids 264–268 respectively. One side of each of solenoids 264–268 is connected to power supply line 109. Solenoids 264–268 operate keys for digits 4, 5, 6, 8 respectively on a calculating machine, as will be described in more detail hereinafter.

In parallel with solenoids 264–268 are relays 274–278 respectively. Relays 274–278 control contacts 284–288, which, as shown in Figure 18C, are in series across lines 103, 109 with solenoids 204, 205, 206, 208, which actuate keys on the adding machine corresponding to digits 4, 5, 6, and 8 respectively.

By the foregoing means, when contact 101 of operating switch 100 engages thickness contact 105 after the trailing edge of a board has left the actuating arm of switch 100 but while the body of the board is still in engagement with the actuating arms of thickness switch 250, a key on the adding machine and a key on the calculating machine will be depressed corresponding to the thickness of the board.

Referring now to Figure 18B, after moving contact 101 of operating switch 100 has successively passed length contact 104 and thickness contact 105 on release of the actuating arm of switch 100, contact 101 next engages contact 106. This contact is in series with solenoid 299 which actuates a key on the calculating machine to cause it to multiply the length and thickness factors previously set on the machine.

Referring again to Figure 1, at about the same time the leading edge of a board depresses some of the length switch actuators 122–130 and engages the actuating arms of thickness switch 250, it depresses the first of a series of width switch actuators 304, 306, 308, 310, 312. Then, as shown in Figure 4, as the board travels along the conveyor it will successively depress all of the width switch actuators 306–312. The first width switch actuator 304 is spaced about four inches downstream from the operating switch 100, preferably a little less than four inches. Actuators 304–312 are spaced two inches apart. With this spacing, as the trailing edge of a board leaves the actuating arm of operating switch 100, it will be depressing one or more of switch actuators 304–312 depending on whether the board width is 4, 6, 8, 10 or 12 inches.

Referring to Figure 18B, switch actuators 304–312 control normally open switches 314, 316, 318, 320, 322 respectively. Switch actuator 306 also controls normally closed switch 326 in series with switch 314, and in like manner actuators 308–312 control normally closed switches 328, 330, 332 in series with switches 316–320 respectively. As will be described in more detail hereinafter, each of the normally open switches 314–322 is in series with a width reacting means for recording width and/or for introducing a width factor into a calculating machine. As the trailing edge of a board leaves operating switch 100 it will not only be in position to close all of the switches of group 314–322 from switch 314 on through the switch corresponding to its particular width, but will also open switches of the group 326–332 in series with each of the switches of group 314–322 that it has closed except the one switch corresponding to its particular width. By this means a board prepares a circuit for one and only one width reacting means for energization by operating switch 100 when its moving contact 101 first starts on its return motion and engages fixed contact 104. Before the board leaving operating switch 100 travels downstream far enough to depress additional switch actuators the moving contact 101 of switch 100 will have left fixed contact 104 so that such further motion of the board will have no effect on the width reacting means.

As shown in Figure 18B, switches 314–322 are in series with relays 344, 346, 348, 350, 352, respectively, hereinafter sometimes referred to as preparatory width relays, forming part of the several width reacting means. One side of each of relays 344–352 is connected to power supply line 109. Relays 344–352 control normally open contacts 354, 356, 358, 360, 362 respectively which when closed connect the associated relays to power supply line 103 through normally closed switch 102. By this means, once a preparatory width relay has been energized as operating switch contact 101 moves over fixed contact 104, it remains energized even after contact 101 leaves contact 104 until such time as the board depresses switch actuator 78 which controls switch 102 and causes it to open.

Relays 344–352 control normally open contacts 364, 366, 368, 370, 372 respectively which contacts are all in parallel and the group of contacts is in series with relay 373 and contacts 102 across power supply lines 103, 109. Relay 373 controls normally closed contacts 374 in series with the line from contact 104 to relays 344–352. By this means, as soon as contact 101 engages contact 104 and causes one of relays 344–352 to be energized, relay 373 becomes energized and opens contacts 374 to prevent any other of relays 344–352 from becoming energized. Therefore, although a board having left operating switch 100 travels downstream and depresses all of the remaining width switch actuators, if any, that it has not previously depressed, such depression will have no effect on relays 344–352 of the width reacting means even though contact 101 of operating switch 100 may still be on fixed contact 104.

Relays 344–352 also control normally open contacts 384, 386, 388, 390 and 392 in series with solenoids 394, 396, 398, 400, 402 respectively. Relay 352 also controls normally open contacts 392A in parallel with contacts 392. Solenoids 394–402 actuate keys on the calculating machine corresponding to digits 6, 4, 3, .4, and 2 respectively. One side of each of solenoids 394–402 is connected to power supply line 109. One side of each of contacts 384–392 is connected to fixed contact 107 of the operating switch 100. By this means, when moving contact 101 of the operating switch engages contact 107, which may be called the width contact, on its return motion after release by the trailing edge of a board, one of solenoids 394, 396, 398, 402, or both solenoids 400, 402, will be energized to depress one or more keys on the calculating machine to introduce a width factor into the machine corresponding to the width of the particular board as measured by switch actuators 304-312 and passed on through one of relays 364-372.

The width factors thus introduced are divided into the result previously obtained by multiplying the length and thickness factors. For this reason the width factors introduced into the calculating machine bear a reciprocal relationship to the widths. To take into account the fact that the length factor introduced was only half the true length as measured in fact and that the thickness factor introduced was four times the actual thickness measured in inches, and the fact that the width should be measured in feet rather than in inches if the product of length thickness and width is to give board feet, the width factor introduced into the calculating machine is equal to 24 divided by the width in inches. Thus, according to whether the board is 4, 6, 8, 10 or 12 inches wide, keys on the calculating machine corresponding to digits 6, 4, 3, 2.4 or 2 are actuated. The 2.4 is the only two digit factor and is taken care of by the two sets of contacts 390, 390A.

In parallel with solenoids 394-400 are relays 404, 406, 408, 410. Relay 412 and normally open contacts 392A in series therewith controlled by relay 352 are in parallel with solenoid 402 and contacts 392. As shown in Figure 18C, relays 404-412 control pairs of contacts 414A, 414B; 416A, 416B; 418A, 418B; 420A, 420B; and 422A, 422B in series with pairs of solenoids 220-204, 220-206, 220-208, 210-220, and 210-212, respectively which actuate pairs of keys on the adding machine corresponding to digits 04, 06, 08, 10 and 12, respectively. Although contacts 414B-422B are actuated by the same relays as contacts 414A-422A, they are closed after contacts 414A-422A so that the keys for the digits are depressed in the proper sequence. By the foregoing means when contact 101 of the operating switch engages width contact 107 on the return motion of switch 100 after the trailing edge of a board has left switch 100, a pair of keys on the adding machine is actuated corresponding to the width of the board.

After contact 101 of operating switch 100 leaves width contact 107 it engages contact 108. In series with contact 108 are paralleled solenoids 430, 431. Solenoids 430A and 430B actuate the divide keys on the calculating machine to cause it to compute the board feet in the board just passed. Solenoid 431 actuates the tab key on the adding machine to cause it to record on its tape the digits corresponding to the dimensions of the board just passed, the length being recorded in feet, the thickness in quarters of an inch, and the width in inches.

Referring again to Figure 1, after a board leaves operating switch 100 it moves downstream and ultimately releases all the length and width switch actuators and the actuating arm for the thickness switch. Thereafter the board depresses switch actuator 78 which not only sets up the circuit for the lumber straightening device to allow pins 50 to be depressed when the next board is straightened, but also opens normally closed contacts 192 to de-energize the one of preliminary width relays 344-352 that had been energized, and to de-energize relay 373 which is also de-energized by the de-energization of the preliminary width relay.

Referring now to Figures 5 and 7, the thickness measuring switch 250 comprises actuating arms 500, 501 adapted to engage the upper and lower surfaces of a board. Arm 500 is affixed to shaft 502. Arm 501 is rotatably mounted on shaft 502. Shaft 502 is rotatably mounted in bearing 503. Helical spring 504 is secured at one end to shaft 502 and at its other end to bearing 503, tending to turn shaft 502 clockwise as viewed from the left in Figure 6, until stops 504' and 505 connected to arm 500 and bearing 503 respectively are engaged. Helical spring 506 is connected at one end to shaft 502 and at the other end to arm 501, tending to turn arm 501 counterclockwise on shaft 502 as viewed from the left in Figure 6, until stops 507 and 508 connected to shaft 502 and arm 501 respectively are engaged. This construction is the same as that of the thickness responsive switch disclosed in the aforementioned United States patent application of Lionel H. Wheeler, where it is described in greater detail.

Connected to actuating shaft 502 and thus to actuating arm 500 is multiple contact support arm 510 carrying contacts 254, 255, 256, 258. Connected to actuating arm 501 is single contact support arm 511 carrying contact 251.

Figure 9:
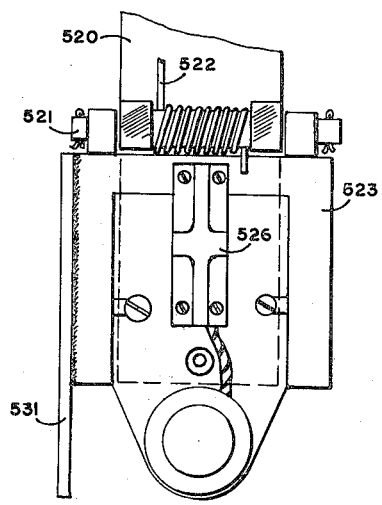
Figure 9 is a rear elevation of the device shown in Figure 8.

Referring now to Figures 8 and 9, there is shown a switch and switch actuator suitable for use as any of the length or width switch actuators and switches or for the actuators and associated switches at the lumber straightening and feeding device, or the volume recorder switch and associated actuator 90, or the past measuring actuator 78 and its associated switch. The actuator comprises an arm 520 pivotally mounted on shaft 521. A helical spring 522 is connected at one end to arm 520 and at the other to frame 523 on which shaft 521 is mounted, tending to turn the arm 520 clockwise on shaft 521, as viewed in Figure 8, until adjustable stops 524 on frame 523 and stop portion 525 of arm 520 are engaged. A conventional or any suitable switch 526 of the limit switch or micro-switch type is mounted on frame 523 with its actuating pin 527 in position to be engaged by adjustable button 528 carried by arm 520. Switch 526 may contain any desired number of normally open and normally closed contacts as desired. Additional switches may be mounted on frame 523 alongside of switch 526 and actuated in like manner by arm 520 if desired or required. For convenience, switch 526 is connected by a cable 529 to a plug and socket connector 530 for connection in the electric circuit previously described. Connector 530 is mounted on frame 523 which in turn is mounted on bracket 531 for convenience in fastening to the framework of conveyor 32 to properly position the actuator arm.

Referring now to Figure 7, there is shown operating switch 100 whose actuator arm is similar in construction to that shown in Figures 8 and 9 and comprises an arm 530 pivotally mounted on shaft 531 and biased clockwise by helical spring 532 against adjustable stop 533. Contact 101 carried by arm 530 is adapted to successively engage contacts 108-104 when arm 530 is depressed and to return over these same contacts when arm 530 is released. A stop 111 limits the travel of contact 101. Preferably contact 108 is made a little wider than the others so as to allow for any bounce on engagement of contact 101 or the arm 530 with stop 110, so that contact 101 will remain in engagement with contact 108 and not cause repeated undesired actuation of the tab and divide keys on the adding and calculating machines.

Referring now to Figure 10 there is shown a calculating machine 600. Specifically, this is a model STW machine manufactured by Friden Calculating Machine Co., Inc. whose operating is described in a booklet entitled "Friden Fully Automatic Calculator—Operating Instructions and Suggestions," copyright 1949 by the Friden Calculating Machine Co., Inc., San Leandro, California, U. S. A. The length factor corresponding to each board passing by the measuring station of this invention is introduced into the calculating machine by depressing one or more keys of the square bank of one hundred keys at the right central portion of the machine. Depending on how many decimals are desired in the calculated volume, the length factor is introduced by depressing keys farther to the left of the bank for more decimals, farther to the right for fewer decimals and higher speed. For example, solenoids 162–169 may depress the keys 602–609 respectively corresponding to digits 2–9 in the fourth column from the right and solenoids 170, 171 may depress keys 610, 611 corresponding to the digit 1 in the fifth column from the right and digit 0 in the fourth column from the right.

To introduce a thickness factor into the calculating machine, one of the keys in the square bank of nine keys at the left of the machine is used, thus, solenoids 264, 265, 266, 268, actuate keys 614, 615, 616, 618 corresponding to digits 4, 5, 6 and 8 respectively.

To multiply the length and thickness factors solenoid 299 actuates key 619. In order that after the multiplication of the length and thickness factors the keyboard clear itself automatically it is necessary that the "add key" 620 be displaced downward from the position shown in Figure 10. This also causes the keyboard to clear itself automatically after the division operation next to be described.

To introduce width factors into the calculating machine, solenoids 394–402 operate keys 624, 626, 628, 630, 632 respectively corresponding to digits 6, 4, 3, 4, and 2 respectively. Keys 624, 626, 628, and 632 are in the seventh column from the right in the square bank of one hundred keys. Key 630 is in the sixth column from the right in this same bank, so that it corresponds to 0.4 compared to key 626 which represents 4.0. After a width factor has been introduced into the calculating machine, solenoid 430 actuates division keys 633, 634, which divide the division factor into the product of the length and thickness factors previously obtained. In order that this result be added to the result of the calculation performed for the previous board, the lock 635 is turned transverse to the position shown in Figure 10. This causes the results to accumulate on the ten upper right hand dials 641–650. At the same time the keyboard is automatically cleared.

Referring now to Figure 11, there is shown one of the solenoids for actuating the calculating machine and adding machine keys. It comprises a coil 660 within which rod 661 of magnetic material is adapted to reciprocate. Rod 661 is also supported by sleeve bearing 662 and is urged upwardly by helical spring 663, compressed between the top of bearing 662 and a collar 664 secured to rod 661. To the lower end of rod 661 is secured a rod 665 of non-magnetic material, such as stainless steel. Rod 661 is directly over one of the keys 666 of the adding or calculating machine. By this means, when coil 660 is energized it draws rod 661 down against the force of spring 663 and causes rod 665 to depress key 666. On de-energization of coil 660, spring 663 returns rods 661 and 665 to their uppermost position releasing key 666.

Figure 12:
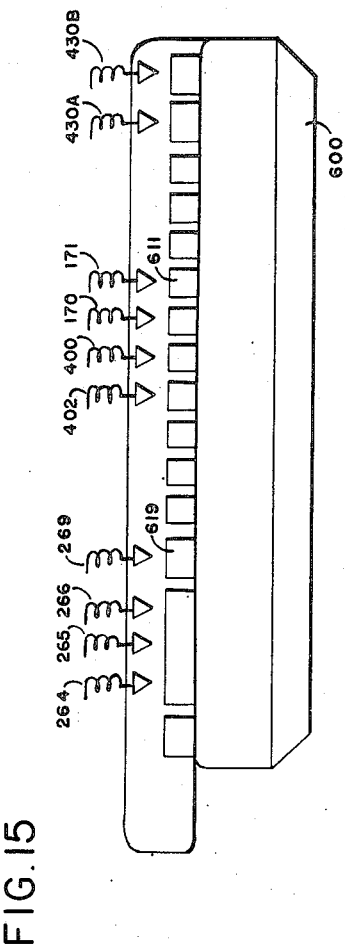
Figure 12 is a front elevation of the calculating machine shown in Figure 10, together with a schematic indication of the key actuators.

Referring now to Figure 12, there is shown schematically the arrangement of a plurality of solenoids, such as that shown in Figure 11, over the top of the adding machine keyboard. At the right are shown solenoids 430A and 430B for actuating the divide keys. At the center right are shown solenoids 402, 400, 170, 171 of the width and length factor entering solenoids. At the left are shown solenoids 264, 265, 266, for entering thickness factors and solenoid 299 for actuating the multiplication key.

Figure 13:
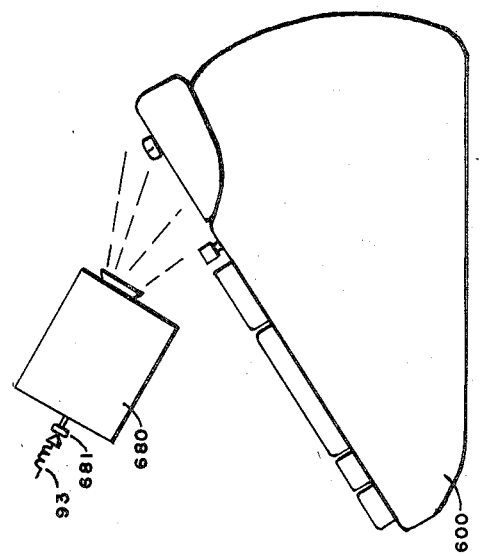
Figure 13 is a side elevation of the calculating machine shown in Figure 10, together with a schematic representation of a camera used in connection therewith.

Referring now to Figure 13 there is shown calculating machine 600 with an automatic camera 680 disposed in position to photograph the dials 641–650 of the calculating machine to record the accumulated total of board feet as registered on these dials of the calculating machine. Solenoid 93, similar to that shown in Figure 11, actuates button 681 on the camera to cause it to take a picture and automatically turn its film to prepare it for the next exposure. The lens of camera 680 may be suitably masked so that only the numbers on dials 641–650 of the calculating machine are photographed. Camera 680 is preferably of the type producing a permanent positive record. If desired, a clock-calendar may be disposed so as to be included in the view of the camera so as to show on the record not only the board feet accumulated but the time.

Figure 14:
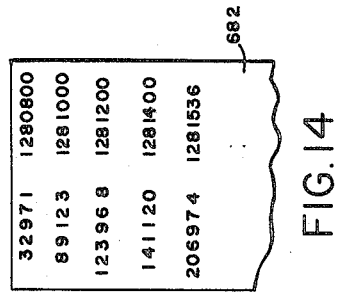
Figure 14 is a plan view of a portion of the record produced from the calculating machine by the camera.

Figure 14 shows a portion of a record 682 produced by camera 680 including both board feet at the left and time at the right, the time being indicated by three digits showing the number of the day of the year and four digits for the hour and minute.

Figure 16:
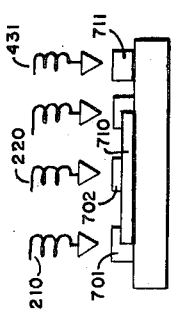
Figure 16 is a front elevation of an adding machine keyboard, together with a schematic representation of the key actuators.
Figure 15:
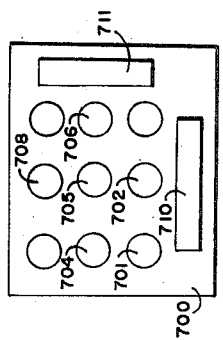
Figure 15 is a plan view of an adding machine keyboard.

Referring now to Figures 15, 16 there is shown the keyboard of an adding machine 700. Keys 701, 702, 704, 705, 706, 708, 710 are adapted to be actuated by solenoids 210, 212, 204, 205, 206, 208, 220, respectively to record digits 1, 2, 4, 5, 6, 8, 0 and combinations thereof on the adding machine tape when solenoid 431 is energized to actuate the "tab" key 711.

Figure 17:
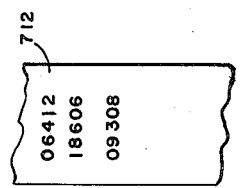
Figure 17 is a plan view of a portion of the record produced by the adding machine.

Figure 17 shows a portion of the record 712 produced by the adding machine. The right show width in inches, at the center show thickness in quarter inches, and the two columns at the left show length in feet.

Summarizing briefly the operation of the invention as above described, a board moving along conveyor 30 will be transferred to conveyor 32 and speeded up so as to separate it from following boards. It will then be held up by pins 50 until it lies straight across conveyor 32 and until a preceding board has passed over switch actuator 78. Then the board will pass over operating switch 100 and move its moving contact 101 over against stop 111. The board will then engage the thickness switch 250 and one or more of the width and length switch actuators and will still be in engagement therewith when it leaves operating switch 100. This causes contact 101 to move back over contacts 104–108 to record the length, thickness and width of the board and calculate the board feet therein and add it to the volume of the previous board and register the total. The board then passes over switch actuator 78 to allow the pins 50 to drop to let the next board move along. At pre-set time solenoid 93 is actuated to record the volume of board feet that has thus far passed through the device. Also the solenoid 93 can be actuated by the operator pulling a board out on the conveyor to depress switch actuator 90 or by manually closing switch 95.

While a preferred embodiment of the invention has been shown and described many modifications thereof can be made by one skilled in the art without departing from the spirit of the invention and it is desired to cover by Letters Patent all forms of the invention falling within the scope of the following claims.

We claim:

1. In a lumber transfer apparatus, first means for conveying boards positioned with their lengths transverse to their direction of travel and lying on their sides, second means for conveying lumber from said first conveyor means in the same position as on said first conveyor means but at a higher speed than said first conveyor means, means adjacent said second conveyor means responsive to the dimensions of a board on said second conveyor means to produce a desired indication, means in advance of said dimension responsive means to straighten boards across the second said conveyor means and hold up their travel along said second conveyor means, and means responsive to the passage of a board from said dimension responsive means to render inactive said board hold up means with respect to the next succeeding board when straightened across said second conveyor means.

2. In a lumber transfer apparatus, means for conveying boards positioned with their lengths transverse to their direction of travel and lying on their sides, means adjacent said conveyor means responsive to the dimensions of a board on said conveyor means to produce a desired indication, means in advance of said dimension responsive means to straighten boards across said conveyor means and hold up their travel along said conveyor means, and means responsive to the passage of a board from said dimension responsive means to render inactive said board hold up means with respect to the next succeeding board when straightened across said conveyor means.

3. The combination of claim 2 in which said conveyor means comprises a plurality of endless flexible means spaced apart across the conveyor means and said straightening and hold up means comprises a plurality of stop members mounted for movement up and down in spaces between said endless means between positions above and below the plane of the bottoms of boards traveling on said conveyor means.

4. The combination of claim 3 in which said straightening and hold up means comprises operating means for moving said stop members up and down and means disposed in a line straight across said conveyor means normally rendering said operating means inoperable to lower said stop members but responsive to the presence of a board straight across the conveyor in line therewith to render said operating means effective to lower said stop members when said means responsive to the passage of a board from said dimension responsive means is actuated.

5. The combination of claim 4 with means responsive to the passage of a board from said straightening and hold up means toward said dimension responsive means to render said operating means ineffective to maintain said stop members in lowered position and to raise said stop members.

6. In a lumber measuring apparatus, means for conveying boards positioned with their lengths transverse to their direction of travel and lying on their sides, and means adjacent said conveyor means responsive to the dimensions of a board on said conveyor means to produce a desired indication, said dimension responsive means being responsive to different dimension magnitudes over a range of each magnitude of each board dimension to produce a different indication for each different magnitude.

7. The combination of claim 6 in which said dimension responsive means includes means to record the dimensions of each board.

8. The combination of claim 6 in which said dimension responsive means includes means to determine a product function of the dimensions of each board to indicate the volume thereof.

9. The combination of claim 8 in which said dimension responsive means also includes means to accumulate the sum of said product functions to indicate the accumulated volume of boards that have passed said dimension responsive means.

10. The combination of claim 9 in which said product function determining and summation accumulating means comprise a calculating machine of the rotating disc type.

11. The combination of claim 9 in which said dimension responsive means includes also means to record the accumulated volume at desired times.

12. The combination of claim 11 in which said dimension responsive means includes also means to record the dimensions of each board.

13. The combination of claim 6 in which said dimension responsive means includes a plurality of switch actuators disposed spaced apart across said conveyor means to be actuated by boards of different lengths, a plurality of switch actuators spaced apart in the direction of travel of a board along said conveyor means to be actuated by boards of different widths, and a pair of pivotally mounted actuating arms disposed in the path of travel of a board along said conveyor means in position to be separated by a board according to its thickness, a plurality of electric switches controlled by said switch actuators and actuating arms, and dimension reacting means controlled by said switches to produce said desired indication.

14. The combination of claim 13 in which said dimension reacting means includes length reacting means and width reacting means and thickness reacting means controlled respectively by those of said electric switches that are actuated respectively by said length switch actuators, width switch actuators and thickness actuating arms.

15. The combination of claim 14 in which said dimension reacting means includes a board controlled operating switch means for applying electric power successively to said three dimension reacting means while in position to react under the control of said electric switches.

16. The combination of claim 15 in which each of said three dimension reacting means includes means for actuating keys on a recording machine.

17. The combination of claim 16 in which said recording machine is an adding machine and there is means for actuating the tab key on the adding machine and said operating switch means applies power to said tab key actuating means after applying power to said three dimension reacting means.

18. The combination of claim 15 in which each of said three dimension reacting means includes means for actuating keys on a calculating machine and said calculating machine also is provided with means to actuate keys thereof to cause it to multiply and divide and said operating switch means applies power to said multiply key actuating means after said length and thickness reacting means and to said divide key actuating means after said width key actuating means.

19. The combination of claim 18 in which said calculating machine includes means to accumulate the summation of the results of the calculation performed thereby for each board.

20. The combination of claim 19 in which said dimension responsive means includes means for recording the accumulated summation on the adding machine.

21. The combination of claim 20 in which said recording means is actuated by boards on said conveyor means.

22. The combination of claim 21 in which said board actuating means includes a switch actuator disposed outside the even lumber line of said conveyor means.

References Cited in the file of this patent

UNITED STATES PATENTS

| | | |
|---|---|---|
| 1,307,369 | Messiter | June 24, 1919 |
| 1,706,632 | Onstad | Mar. 26, 1929 |
| 1,976,855 | McKee et al. | Oct. 16, 1934 |
| 2,048,192 | Marston | July 21, 1936 |
| 2,403,673 | Mead | July 9, 1946 |
| 2,670,135 | Fleshner et al. | Feb. 23, 1954 |
| 2,691,486 | Work | Oct. 12, 1954 |

UNITED STATES PATENT OFFICE

CERTIFICATE OF CORRECTION

Patent No. 2,828,917 April 1, 1958

Lionel H. Wheeler et al.

It is hereby certified that error appears in the above numbered patent requiring correction and that the said Letters Patent should read as corrected below.

In the grant, lines 1, 2 and 3, for "Lionel H. Wheeler and Mavis J. Green, of Houston, Texas," read -- Lionel H. Wheeler and Mavis J. Green, of Houston, Texas, assignors, by mesne assignments, to H. E. Bovay, Jr., Consulting Engineers, of Houston, Texas, a partnership, --; line 12, for "Lionel H. Wheeler and Mavis J. Green, their heirs" read -- H. E. Bovay, Jr., Consulting Engineers, their heirs --; in the heading to the printed specification, line 4, for "Lionel H. Wheeler and Mavis J. Green, Houston, Tex." read -- Lionel H. Wheeler and Mavis J. Green, Houston, Tex., assignors, by mesne assignments, to H. E. Bovay, Jr., Consulting Engineers, Houston, Tex., a partnership --.

Signed and sealed this 29th day of July 1958.

(SEAL)
Attest:
KARL H. AXLINE
Attesting Officer

ROBERT C. WATSON
Commissioner of Patents